Aug. 26, 1952   A. H. GONYEA   2,608,117
TIRE CHAIN APPLYING CLAMP
Filed June 29, 1948
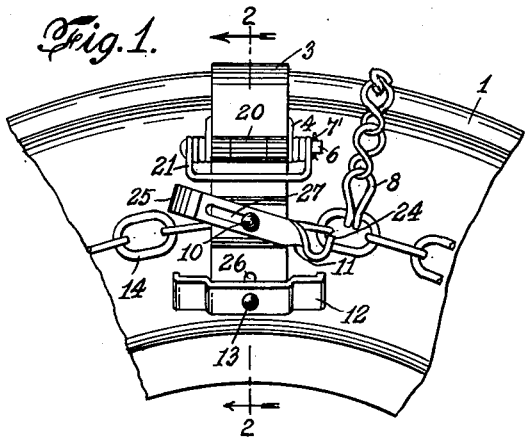
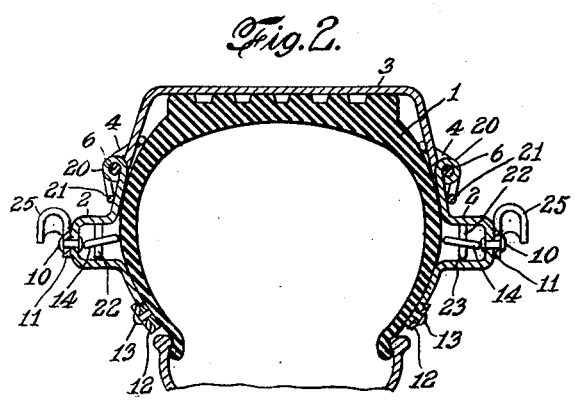
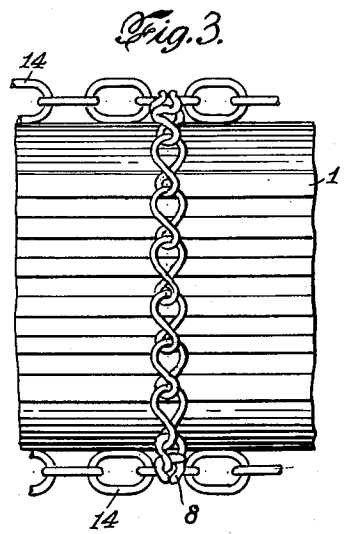
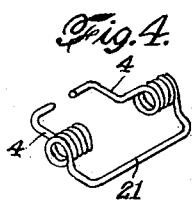
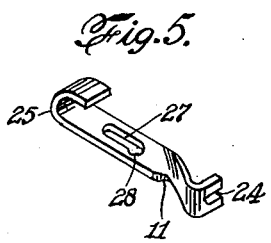
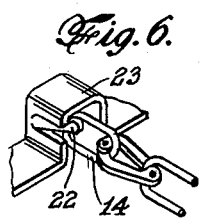
INVENTOR.
ALEXANDER H. GONYEA
BY
ATTORNEY Patented Aug. 26, 1952

2,608,117

UNITED STATES PATENT OFFICE 2,608,117

TIRE CHAIN APPLYING CLAMP

Alexander Homer Gonyea, Yonkers, N. Y.

Application June 29, 1948, Serial No. 35,953

1 Claim. (Cl. 81—15.8)

This invention relates to new and useful improvements in tire chain applying clamp, and it has for its object to provide guiding means which will greatly facilitate the attaching of skid chains to automobile wheels of all kinds of cars.

Thus my device may be especially useful in case of the newer cars, where the mud guards, or side pieces, extend far downwardly, and to a considerable degree cover the wheels of the car.

The device is, however, preferably to be used on regulation sized passenger car tires.

My said device may also with great advantage be used on, for instance, any cars in cold regions, such as Alaska, due especially to the grip plates forming part of my invention, as in this instance a number of grip plates will have to be added in reverse position to the ones shown in the drawing.

The device comprises a flexible steel strap hinged on the sides of a tire and having specially designed coiled springs attached and regulated for a closing and locking pressure against the tire, with special adjustable grip plates at the end to prevent side movement when attached to tire.

The chain adjuster may easily be applied by motorists by means of a snap on and off method.

With the above and other objects in view, this invention consists of the novel features of construction, combination and arrangement of parts, hereinafter fully described, claimed and illustrated in the accompanying drawings forming part of this application, and in which similar characters of reference indicate corresponding parts in all views, and in which:

Figure 1 shows in side elevation a fragmentary portion of a tire with my device attached thereto.

Figure 2 is a transverse sectional view on the line 2—2 in Figure 1.

Figure 3 is a top plan view of a tire with a chain attached; while

Figures 4, 5 and 6 are detail views.

Referring more particularly to the drawing, the numeral 3 indicates a steel strap, as my device comprises three major parts, namely, the upper curved member 3 and two depending hinged side members 2, 2, which latter each engages one side of a tire 1.

One of the hinges connecting one of the members 2, 2 to the steel strap 3, is shown at 20 in Figure 1, said hinge is formed by the bending of the respective ends of the strap 3 and member 2; a cotter pin 6 connects said hinge joint; said cotter pin projects beyond said hinge joint on both sides thereof, as shown at 7, thus permitting coiled springs 4 to be wound on the ends of said cotter pin on each side of the hinge joint.

The said springs 4 are formed with a connecting portion 21, which exerts an inward pressure upon the depending member 2, in order to secure the latter taut against the tire.

The members 2 are each provided with a bent portion 23, while the sides of said bent portion is provided with a cut-out and inwardly bent finger 22 for engagement with a chain link 14, or said finger may be arranged upon the inner side of the bent portion 23 and held by the screw 10.

A lever 11 pivotally fastened as at 10 to the outside of the bent portion 23 is adapted to tighten the chain 8 around the tire, as said lever is formed with a grip 24 at one end and a hook 25 at the other end.

Said lever has an elongated slot 27 terminating at one end in a recess 28, whereby to facilitate the manipulation of said lever in locking the chain in taut position.

The chain guide, or adjuster, is subsequently released by pulling the lever in an outward direction, leaving the chain on the tire in a taut position.

A plate 12 is adjustably mounted at the lower end of the member 2, by means of a bolt 13 and an elongated slot 26 in said member 2.

It is obvious that changes may be made in the form, construction and arrangement of the several parts, as shown, within the scope of the appended claim, without departing from the spirit of the invention, and I do not, therefore, wish to limit myself to the exact construction shown and described herein.

What I claim as new, and desire to secure by Letters Patent of the United States, is:

In a device of the class described, the combination of a steel strap having side portions adapted to partially engage the periphery of a tire, depending side members connected to said side portions, outwardly bent curved enlargements upon said depending side members, fingers disposed within the enlargements for engagement with a chain, a cotter pin connecting the said side portions hingedly with the depending side members, said cotter pin projecting beyond said hinge connections on each side of the latter, coiled springs secured to said projecting ends of the cotter pin and having a connection portion overlying the depending side member and adapted to exert an inward pressure thereupon, and a slidably and rotatably adjustable plate mounted on the lower end of each of said depending side members, said plate having inwardly turned end portions adapted to engage the side wall of a tire.

ALEXANDER HOMER GONYEA.

REFERENCES CITED

The following references are of record in the file of this patent:

UNITED STATES PATENTS

| Number | Name | Date |
|---|---|---|
| 1,119,844 | Leigh | Dec. 8, 1914 |
| 1,460,822 | Moss | July 3, 1923 |
| 2,159,626 | Boycott | May 23, 1939 |
| 2,299,185 | Smola | Oct. 20, 1942 |
| 2,333,877 | Murphy et al. | Nov. 9, 1943 |